US011918147B2

United States Patent
Nicholson

(10) Patent No.: US 11,918,147 B2
(45) Date of Patent: *Mar. 5, 2024

(54) BEAN GRINDING APPARATUS

(71) Applicant: NICHOLSON DESIGN CONSULTANTS LIMITED, Waterlooville (GB)

(72) Inventor: Martin Nicholson, Waterlooville (GB)

(73) Assignee: NICHOLSON DESIGN CONSULTANTS LIMITED, Waterlooville (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/692,313

(22) Filed: Mar. 11, 2022

(65) Prior Publication Data

US 2022/0192425 A1 Jun. 23, 2022

Related U.S. Application Data

(63) Continuation of application No. 16/610,013, filed as application No. PCT/GB2018/051317 on May 15, 2018, now Pat. No. 11,304,564.

(30) Foreign Application Priority Data

May 16, 2017 (GB) ...................................... 1707868
May 17, 2017 (GB) ...................................... 1707889
(Continued)

(51) Int. Cl.
*A47J 42/40* (2006.01)
*A47J 42/06* (2006.01)
(Continued)

(52) U.S. Cl.
CPC ............... *A47J 42/40* (2013.01); *A47J 42/36* (2013.01); *A47J 42/46* (2013.01)

(58) Field of Classification Search
CPC .. A47J 42/40; A47J 42/36; A47J 42/46; A47J 42/38; A47J 42/06; A47J 42/18; A47J 42/08
See application file for complete search history.

(56) References Cited

U.S. PATENT DOCUMENTS 2,554,888 A * 5/1951 Wood ...................... A47J 42/38
                                                      241/285.1
7,874,505 B1    1/2011 Lassota
(Continued)

FOREIGN PATENT DOCUMENTS

CN         1251504 A      4/2000
DE          891727 C     10/1953
(Continued)

OTHER PUBLICATIONS

International Search Report received in PCT/GB2018/051317 dated Oct. 31, 2018, pp. 7.
(Continued)

*Primary Examiner* — Matthew Katcoff
*Assistant Examiner* — Mohammed S. Alawadi
(74) *Attorney, Agent, or Firm* — Liang & Hennessey LLP; Brian Hennessey

(57) ABSTRACT

A bean grinding apparatus including a body; grinding burrs mounted in the body, the burrs including a non-driven burr and a rotationally driven burr, the rotationally driven burr having a rotational axis about which it rotates; a drive motor operatively coupled to the rotationally driven burr; a grounds flow path defined within the body; and an exit spout, the exit spout having an inlet in communication with the grounds flow path and an outlet, wherein the exit spout defines a longitudinal axis and the longitudinal axis of the exit spout is angled with respect to the rotational axis of the driven burr.

8 Claims, 8 Drawing Sheets

(30) Foreign Application Priority Data

| May 17, 2017 | (GB) | ...................................... 1707893 |
| May 17, 2017 | (GB) | ...................................... 1707894 |
| May 31, 2017 | (GB) | ...................................... 1708633 |

(51) Int. Cl.
*A47J 42/36* (2006.01)
*A47J 42/38* (2006.01)
*A47J 42/46* (2006.01)

(56) References Cited

U.S. PATENT DOCUMENTS

| 2005/0263637 | A1* | 12/2005 | Oliver | ..................... A47J 42/56 |
| | | | | 241/282 |
| 2008/0185465 | A1* | 8/2008 | Pai | ......................... A47J 42/08 |
| | | | | 241/100 |
| 2009/0032627 | A1* | 2/2009 | Krasznai | ................. A47J 42/46 |
| | | | | 241/36 |
| 2013/0153698 | A1* | 6/2013 | Zhang | ..................... A47J 42/40 |
| | | | | 241/169.1 |
| 2018/0110369 | A1 | 4/2018 | Piras et al. | |
| 2018/0228319 | A1 | 8/2018 | Kanner | |

FOREIGN PATENT DOCUMENTS

| DE | 3503701 | A1 | 8/1985 |
| DE | 3535119 | A1 | 4/1987 |
| DE | 9115709 | U1 | 3/1992 |
| EP | 1977669 | A1 | 10/2008 |
| FR | 28762 | E | 3/1925 |
| WO | 2016166216 | A1 | 10/2016 |

OTHER PUBLICATIONS

Wood Collector, https://www.amazon.com/Gourmia-GCG9310-Grinder-Artisanal-Settings/dp/B01M5JLEH7/ref+sr_1_17?dchild=1&keywords=wooden+coffee+grinder&qid=1623374212&s=home-garden&sr=1-17.

* cited by examiner

BEAN GRINDING APPARATUS

CROSS-REFERENCE TO RELATED APPLICATIONS

The present application is a continuation application of U.S. patent application Ser. No. 16/610,013, which is a national phase application of PCT Application No. PCT/GB2018/051317, filed May 15, 2018, entitled "BEAN GRINDING APPARATUS", which claims the benefit of British Patent Applications No. 1707868.4, filed May 16, 2017, No. 1707889.0, filed May 17, 2017, No. 1707893.2, filed May 17, 2017, No. 1707894.0, filed May 17, 2017, and No. 1708633.1, filed May 31, 2017, each of which is incorporated by reference in its entirety.

BACKGROUND OF THE INVENTION

1. Field of the Invention

The present invention relates to a bean grinding apparatus, for example a coffee bean grinder.

2. Description of the Related Art

Optimum beverages, such as coffee, are best produced from precise quantities of fresh, just ground, roast coffee beans.

SUMMARY OF THE INVENTION

It is desirable to provide a grind flow path that is as near to vertical as possible and free from any areas where the grounds can collect and be trapped. It is also mechanically desirable to drive a rotationally driven inner burr from below and mount a drive motor as close to the burr as possible.

The object of the present invention is to provide an improved bean grinder.

According to a first aspect of the invention, there is provided a bean grinding apparatus comprising a body; grinding burrs mounted in the body, the burrs comprising a non-driven burr and a rotationally driven burr, the rotationally driven burr having a rotational axis about which it rotates; a drive motor operatively coupled to the rotationally driven burr; a grounds flow path defined within the body; and an exit spout, the exit spout having an inlet in communication with the grounds flow path and an outlet, wherein the exit spout defines a longitudinal axis and the longitudinal axis of the exit spout is angled with respect to the rotational axis of the driven burr.

The exit spout suitably extends downwardly from the body.

In an embodiment of the invention, the rotational axis and the longitudinal axis of the exit spout form an inverted V.

The non-driven burr is suitably fixed with respect to the body. In other words, the non-driven burr may be a stationary burr.

Suitably, the rotational axis is coaxial with a longitudinal axis of the body, whereby the spout is angled with respect to the body.

The angle defined between the rotational axis and the longitudinal axis of the spout may be from 5° to 80°, suitably from 10° to 70°, from 10° to 60°, from 10° to 50°, from 15° to 45°, or from 15° to 30°.

The rotational axis may intersect with the longitudinal axis of the exit spout and the point of intersection is suitably located within the body.

Both the rotational axis and the longitudinal axis of the exit spout may be angled with respect to a vertical plane.

The angle between the rotational axis and the longitudinal axis of the exit spout may have a substantially vertical bisector.

In an embodiment of the invention, the apparatus further includes a grounds directing element located below (i.e. gravitationally below) the burrs, wherein the grounds directing element includes one or more fingers which sweep the grounds into the flow path. The apparatus may define a cavity below the burrs and the grounds directing element may be located within the cavity. The grounds directing element is suitably driven to rotate. The rotational axis of the grounds directing element may be co-axial with the rotational axis of the rotationally driven burr. The grounds directing element may be driven to rotate by the drive motor. The grounds directing element may comprise a plurality of fingers. The or each finger may suitably be angled rearwards from a radius defined from the rotational axis and/or the or each finger may be curved.

The apparatus suitably includes a bean inlet defined above the burrs and an inlet flow path defined from the bean inlet to the burrs.

The exit spout inlet may be aligned with the cavity within which the grounds directing element is located.

In an embodiment of the invention, the apparatus includes a base element, wherein the body of the apparatus is coupled to one end of the base element and an opposite end of the base element defines a grounds collector aperture. The grounds collector aperture suitably receives a grounds collector which is removable from the aperture. The grounds collector aperture is suitably located vertically below the exit spout outlet.

It is also desirable to maintain accurately a rotationally driven inner grinding burr in a position along its rotational axis and for an outer grinding burr to remain aligned with the rotational axis.

According to a second aspect of the invention, there is provided a bean grinding apparatus comprising an inner grinding burr; a complementary outer grinding burr; a shaft carrying the inner burr; a bearing journaling the shaft for rotation about a rotational axis; an outer burr support which supports the outer burr, wherein the support defines a recess within which the outer burr is located; wherein the bearing is arranged concentrically with the recess, such that the inner burr is located concentrically with respect to the outer burr.

In an embodiment of the second aspect of the invention, the apparatus includes a body and the outer burr support is defined by or carried by the body, such that the outer burr support is fixed relative to the body.

The shaft may be operatively connected to a drive motor. By "operatively connected", it is meant that the drive motor directly or indirectly drives the shaft to rotate. For example, a gear arrangement may be located between the drive motor and the shaft.

The apparatus may further include a bearing support plate transversely located with the recess, wherein the bearing is coupled to the centre of the bearing support plate.

The bearing may be a combined journal and thrust bearing.

The shaft may further include a hub secured thereto, wherein the hub is located gravitationally below the inner burr, and the hub includes one or more fingers projecting outwardly therefrom, wherein the fingers sweep the bean grounds radially away from the burrs. As with the first aspect of the invention, the fingers may be angled rearwardly with respect to a radius from the rotational axis.

The apparatus may further include an outer burr adjustment mechanism which adjusts the axial location of the outer burr relative to the inner burr. Thus, the position of the outer burr may be adjusted axially towards or away from the inner burr. The adjustment mechanism may include a first threaded element carried by the outer burr support and a second threaded element carried by the body. The second threaded element may bear directly or indirectly on the outer burr, wherein rotation of the second threaded element relative to the first threaded element causes the outer burr to move axially relative to the inner grinding burr.

The adjustment mechanism may include a biasing element configured to bias the outer burr towards or away from the inner burr. In an embodiment of the invention, the biasing element biases the outer burr away from the inner burr so that the burrs do not contact each other in the absence of beans to be ground under the action of gravity. For example, the biasing element may bias the outer grinding burr into contact with the second threaded element or an intermediate member located between the outer grinding burr and the second threaded element.

The features of the second aspect of the invention may be combined with the features of the first aspect of the invention. Thus, the arrangement of the inner and outer burrs as defined in the second aspect of the invention may form an embodiment of the apparatus as defined above in connection with the first aspect of the invention. In other words, the second aspect of the invention may define embodiments of the first aspect of the invention.

It is further desirable to adjust accurately the particle size of the grounds.

According to a third aspect of the invention, there is provided a bean grinding apparatus comprising a rotationally driven and axially restrained inner grinding burr; a complementary, rotationally restrained and axially moveable outer grinding burr; an outer burr support which defines a recess within which the outer burr is located; an adjustment mechanism for axially moving the outer burr towards or away from the inner burr, the adjustment mechanism counteracting the thrust exerted on the outer burr away from the inner burr that is generated during the grinding process.

In an embodiment of the invention, the adjustment mechanism further includes a biasing element which biases the outer burr away from the inner burr. The biasing element suitably biases the outer burr into contact with the adjustment mechanism.

In a further embodiment, the adjustment mechanism includes a threaded element carried by the outer burr support and a complementary threaded element which is arranged to bear directly or indirectly upon the outer burr to urge it towards or away from the inner burr.

The complementary threaded element may carry an angularly adjustable setting ring, wherein the complementary threaded element and the angularly adjustable setting ring have an indent and detent arrangement for maintaining the position of the angularly adjustable setting ring relative to the complementary threaded element. The indent and detent arrangement between the complementary threaded element and the angularly adjustable setting ring allows the setting ring the be adjusted relative to complementary threaded element, for example during a calibration process, and it further allows the angularly adjustable setting ring to be rotated with the complementary threaded element, for example when the user is selecting a grind setting for the apparatus The complementary threaded element may include indicia relating to the spacing between the burrs. This may be used to set the desired grind for the beans, i.e. the average particle size of the grounds.

The features of the third aspect of the invention may be combined with the features of the first and/or second aspects of the invention. Thus, the arrangement of the inner and outer burrs as defined in the third aspect of the invention may form an embodiment of the apparatus as defined above in connection with the first aspect of the invention and/or the second aspect of the invention. In other words, the third aspect of the invention may define specific embodiments of the first aspect of the invention and/or the second aspect of the invention.

It is known that grinding beans, such as coffee beans, can generate relatively high levels of static charge on the resulting fine ground particles, especially during certain weather conditions. It is generally found that the finer the grind, the more static charge is created. Fine grounds are very light weight, so are significantly affected by the applied static charge. This can make the grinds stick to the surfaces of the grinding apparatus or be urged away from the apparatus.

In order to address this issue, a fourth aspect of the invention is provided. In the fourth aspect of the invention, there is provided a bean grinding apparatus comprising a base element; a body extending upwards from the base element, the body including grinding burrs located therein and defining a grounds flow path from the grinding burrs to an exit spout having a grounds outlet; and a grounds collector platform located on the base, wherein the grounds collector platform is located below the outlet of the exit spout, defines a grounds collector receiving portion and is formed from wood.

In an embodiment of the fourth aspect of the invention, the grounds collector platform is spaced from the upstanding body.

The wooden grounds collector platform may be a two-part component comprising a lower part which is fixed to the base element and a detachable upper part.

The exit spout may be formed from a polymeric material or a metallic material.

The body may be formed from a polymeric material or a metallic material.

The apparatus may include a grounds collector which is shaped to be received by the grounds collector receiving portion. The grounds collector may be formed from a polymeric or a metallic material.

The apparatus may further include feet provided in an underside of the base element. The feet are suitably also formed from wood. The feet may include a sole which defines a friction surface.

The use of wood for the grounds collector platform and optionally the feet significantly reduces or removes the issues associated with the grounds becoming electrostatically charged.

The features of the fourth aspect of the invention may be combined with the features of the first, second and/or third aspects of the invention. Thus, the arrangements described hereinabove in connection with the fourth aspect of the invention may form one or more embodiments of the apparatus as defined above in connection with the first, second and/or third aspects of the invention. In other words, the fourth aspect of the invention may define embodiments of the first, second and/or third aspects of the invention.

It may be desirable to prevent operation of a bean grinding apparatus in certain situations.

According to a fifth aspect of the invention, there is provided a bean grinding apparatus comprising a reservoir in communication with a set of grinding burrs, wherein at least one of the grinding burrs is driven to rotate by an electric motor; the reservoir is defined by a reservoir body; the grinding apparatus further includes a cover hingedly coupled to the reservoir body and having a closed configuration in which the reservoir is covered by the cover and access to the reservoir is prevented, and an open configuration in which access to the reservoir is permitted; the electric motor includes an immobilising switch having an operating position which permits the operation of the motor, and an immobilised position in which operation of the motor is prevented; the cover includes a switch engagement element; and wherein the switch engagement element positions the immobilising switch in the operating position when the cover is in its closed configuration.

In an embodiment of the fifth aspect of the invention, the immobilising switch is biased to its immobilised position.

The immobilising switch suitably interrupts power to the electric motor when in its immobilised position.

In a further embodiment of the invention, the switch engagement element comprises a projecting rod and the immobilising switch defines an apertures which is sized and configured to receive therein the projecting rod.

The reservoir may include an opening and the cover covers the entirety of the reservoir opening when in its closed configuration.

In order that it is possible to see the quantity of beans within the reservoir, the cover may be transparent.

In a further embodiment of the invention, the cover and/or the reservoir body includes a latch configured to releasably retain the cover in its closed configuration.

In a yet further embodiment, the spacing between the grinding burrs is variable to vary the output of ground coffee beans; the grinder includes a manual controller which controls the grinding burrs; and the cover further covers the manual controller when in its closed configuration.

The skilled person will appreciate that the features described and defined in connection with the aspects of the invention and the embodiments thereof may be combined in any combination, regardless of whether the specific combination is expressly mentioned herein. Thus, all such combinations are considered to be made available to the skilled person.

BRIEF DESCRIPTION OF THE DRAWINGS

An embodiment of the invention will now be described, by way of example only, with reference to the accompanying drawings in which.

DETAILED DESCRIPTION

Figure 1:
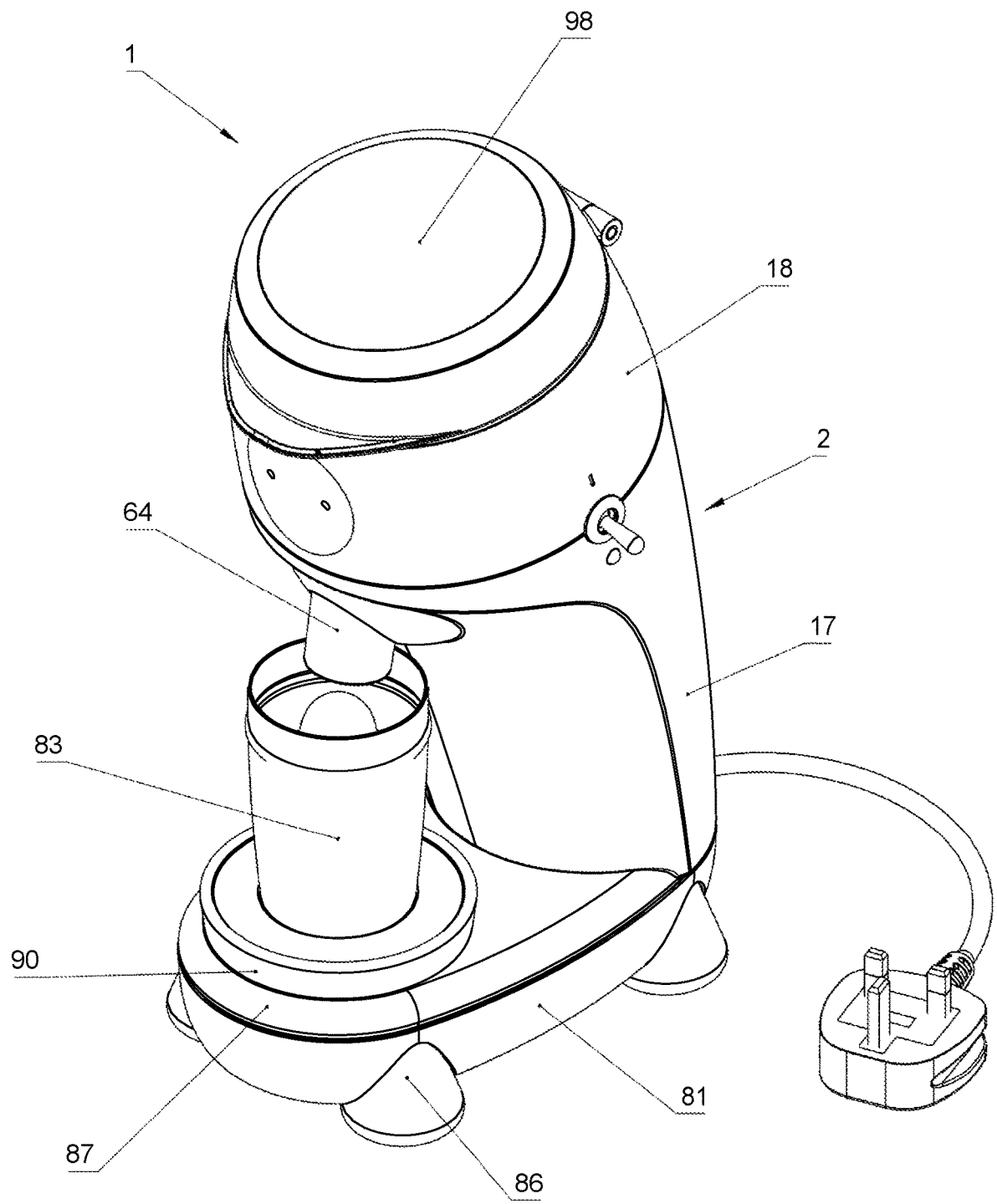
FIG. 1 is a perspective view of a bean grinding apparatus according to the invention.
Figure 2:
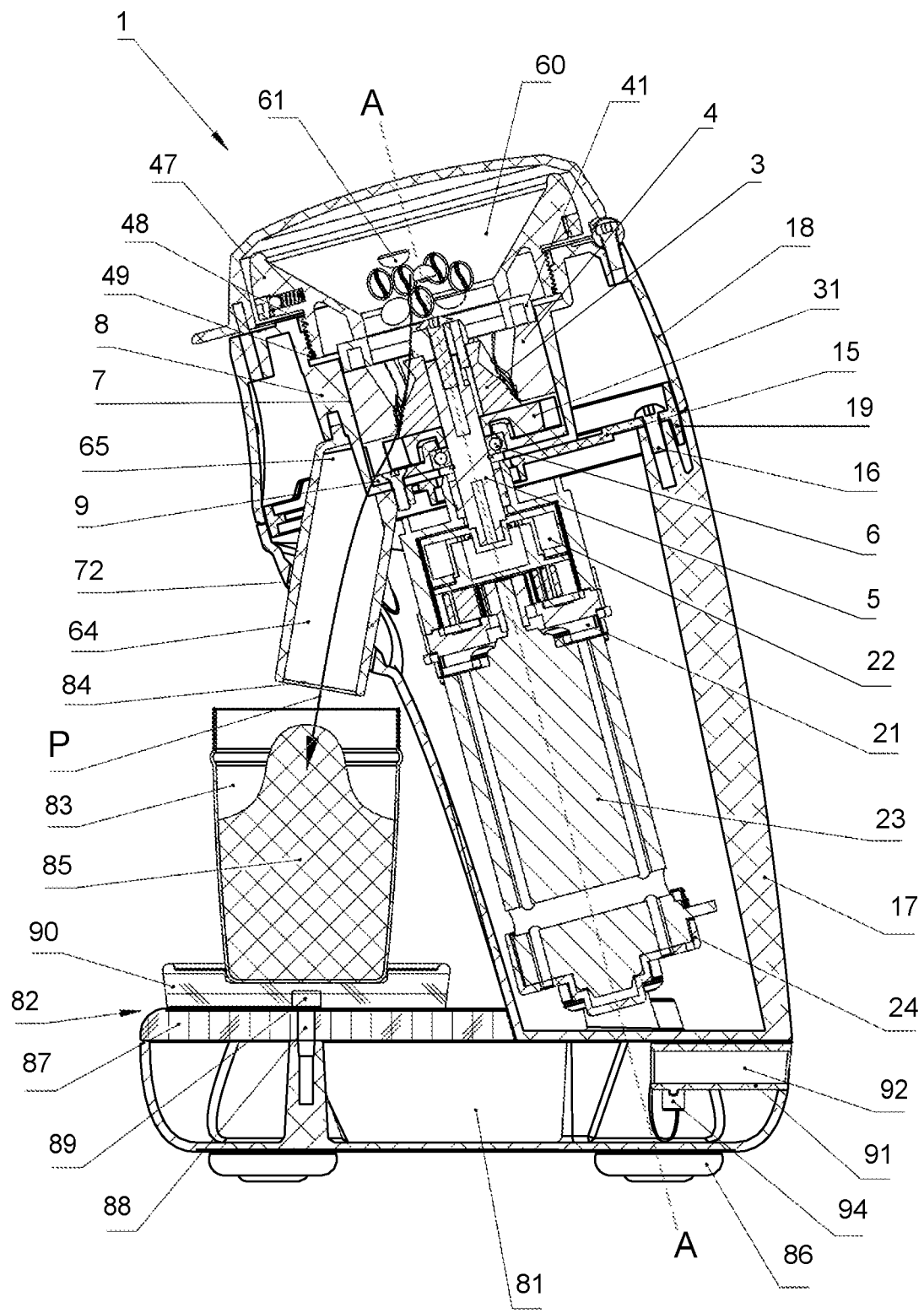
FIG. 2 is a side section view of the bean grinding apparatus shown in FIG. 1 taken along A-A.
Figure 3:
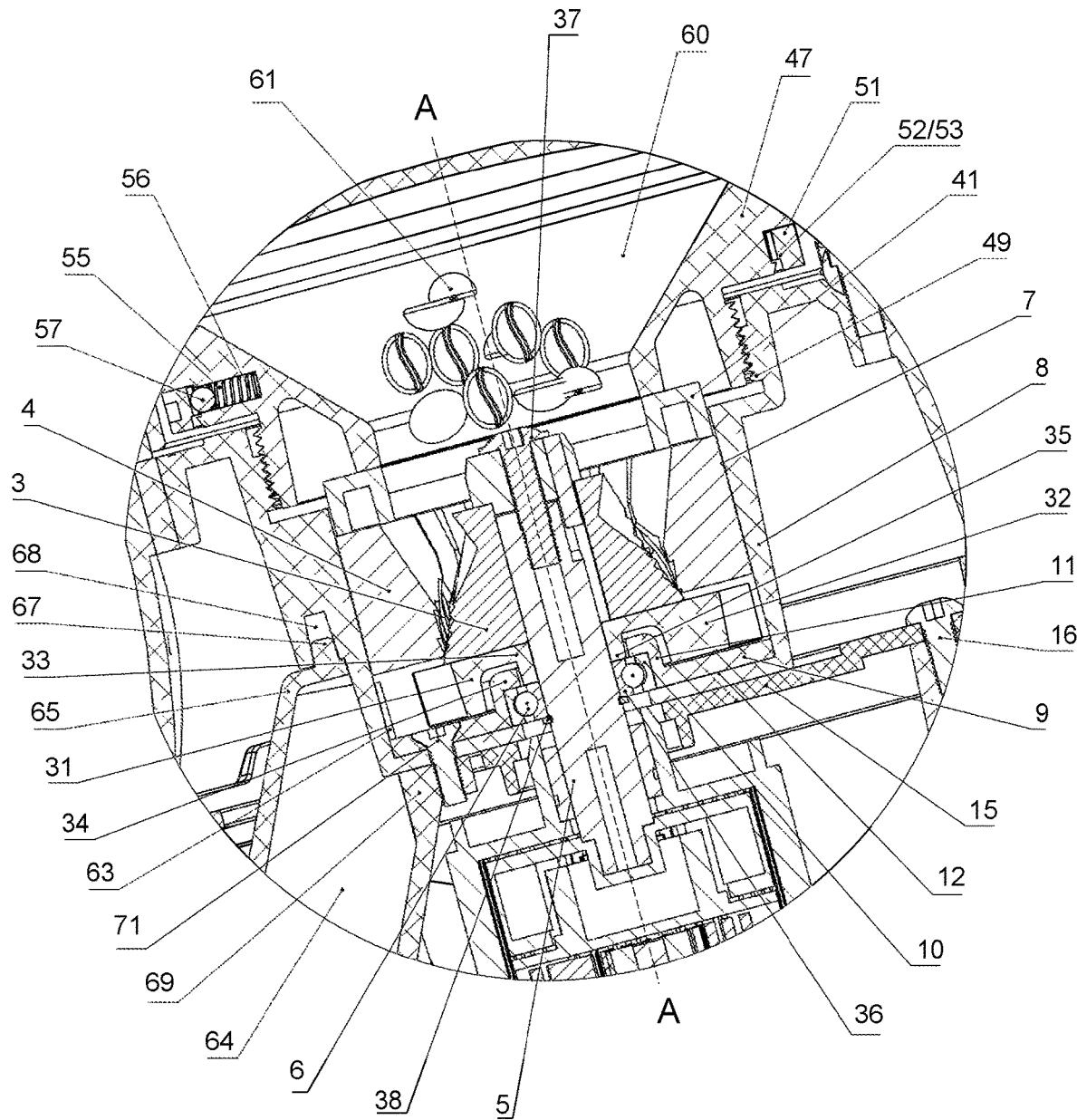
FIG. 3 is an enlarged side section detail view of the bean grinding apparatus shown in FIG. 1.
Figure 4:
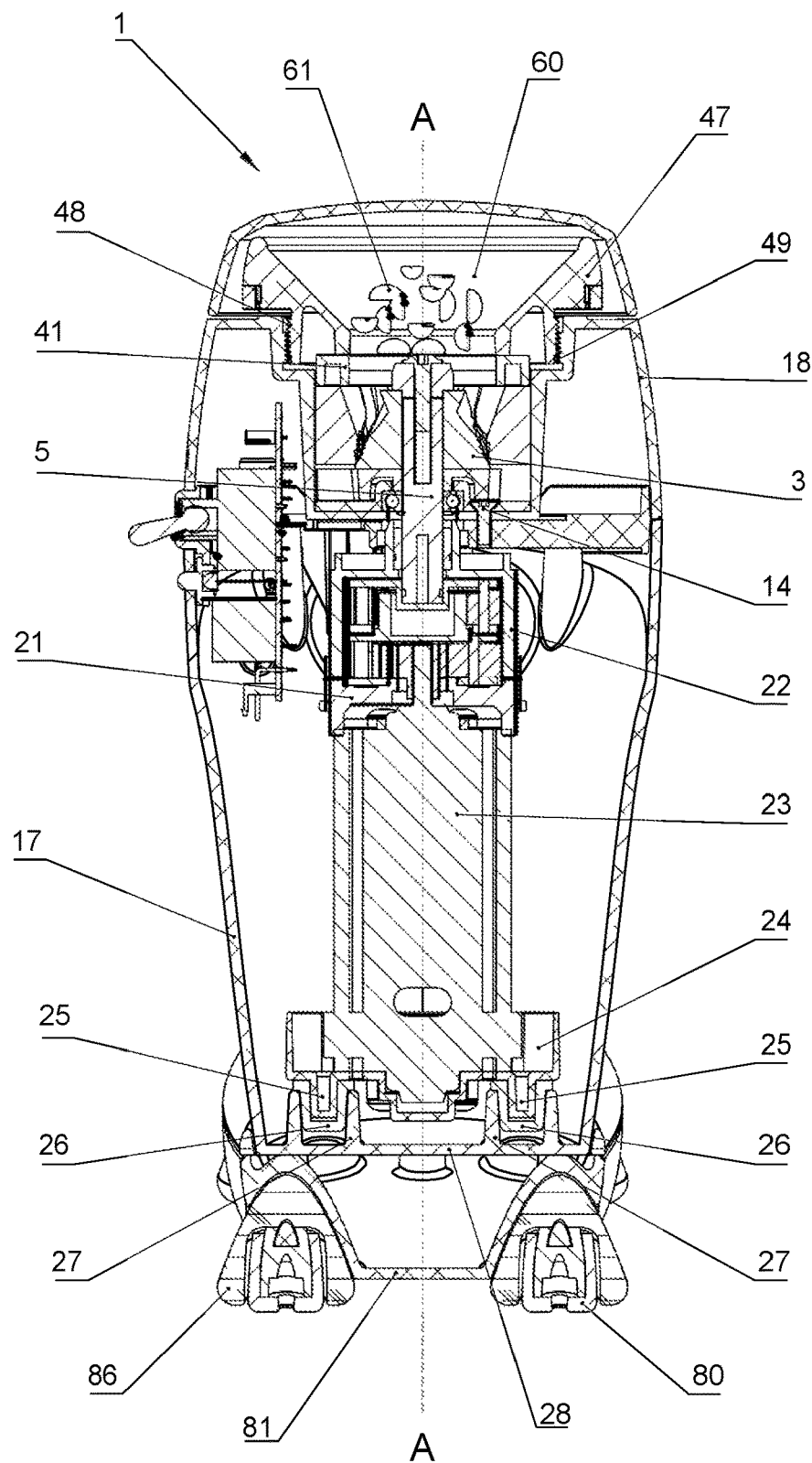
FIG. 4 is a rear section view of the bean grinding apparatus shown in FIG. 1 taken along A-A.
Figure 5:
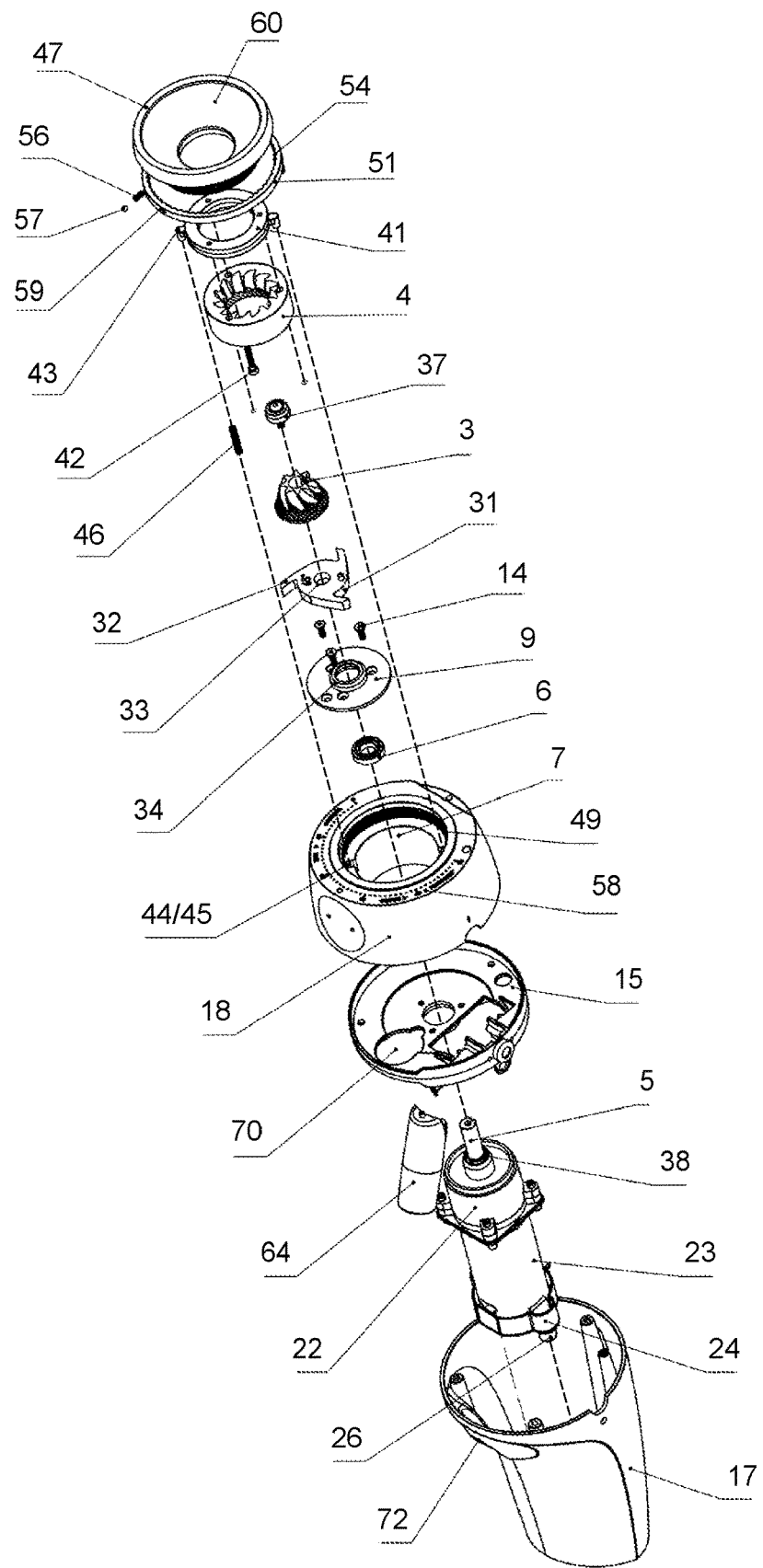
FIG. 5 is a perspective exploded view of the bean grinding mechanism.
Figure 6:
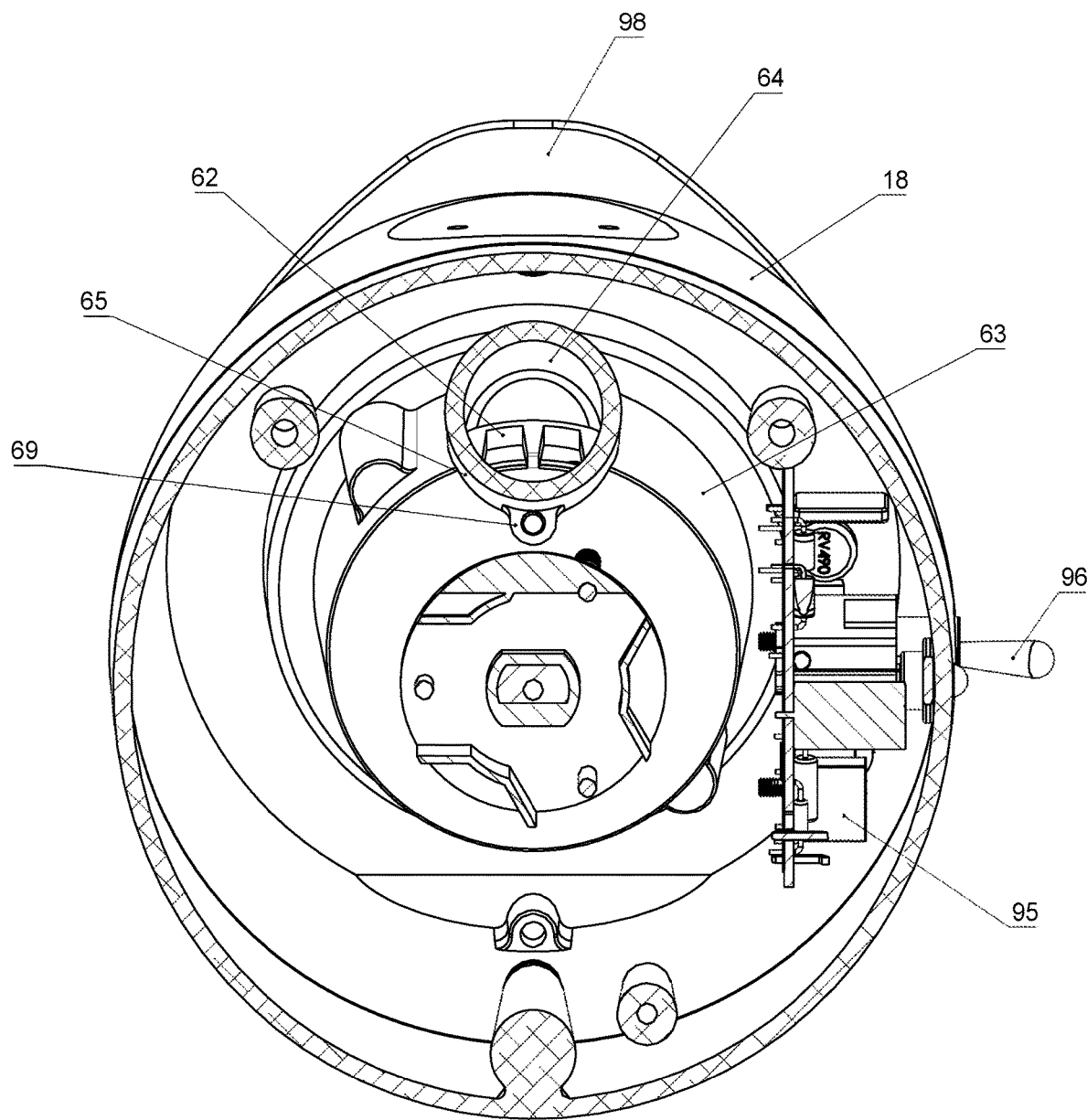
FIG. 6 is a horizontal section view of the bean grinding apparatus shown in FIG. 1.
Figure 7:
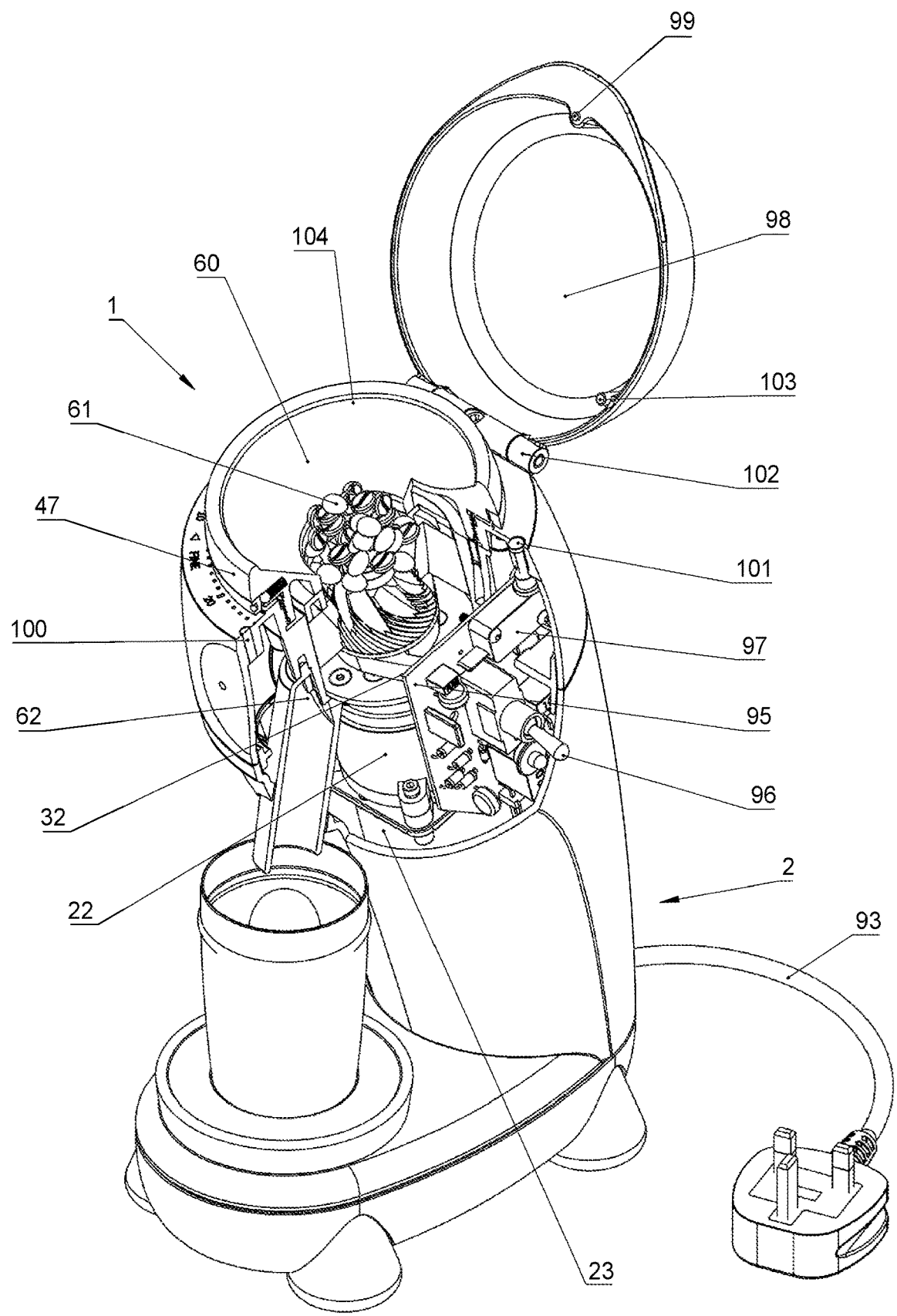
FIG. 7 is a perspective partial section view of the bean grinding apparatus shown in FIG. 1.
Figure 8:
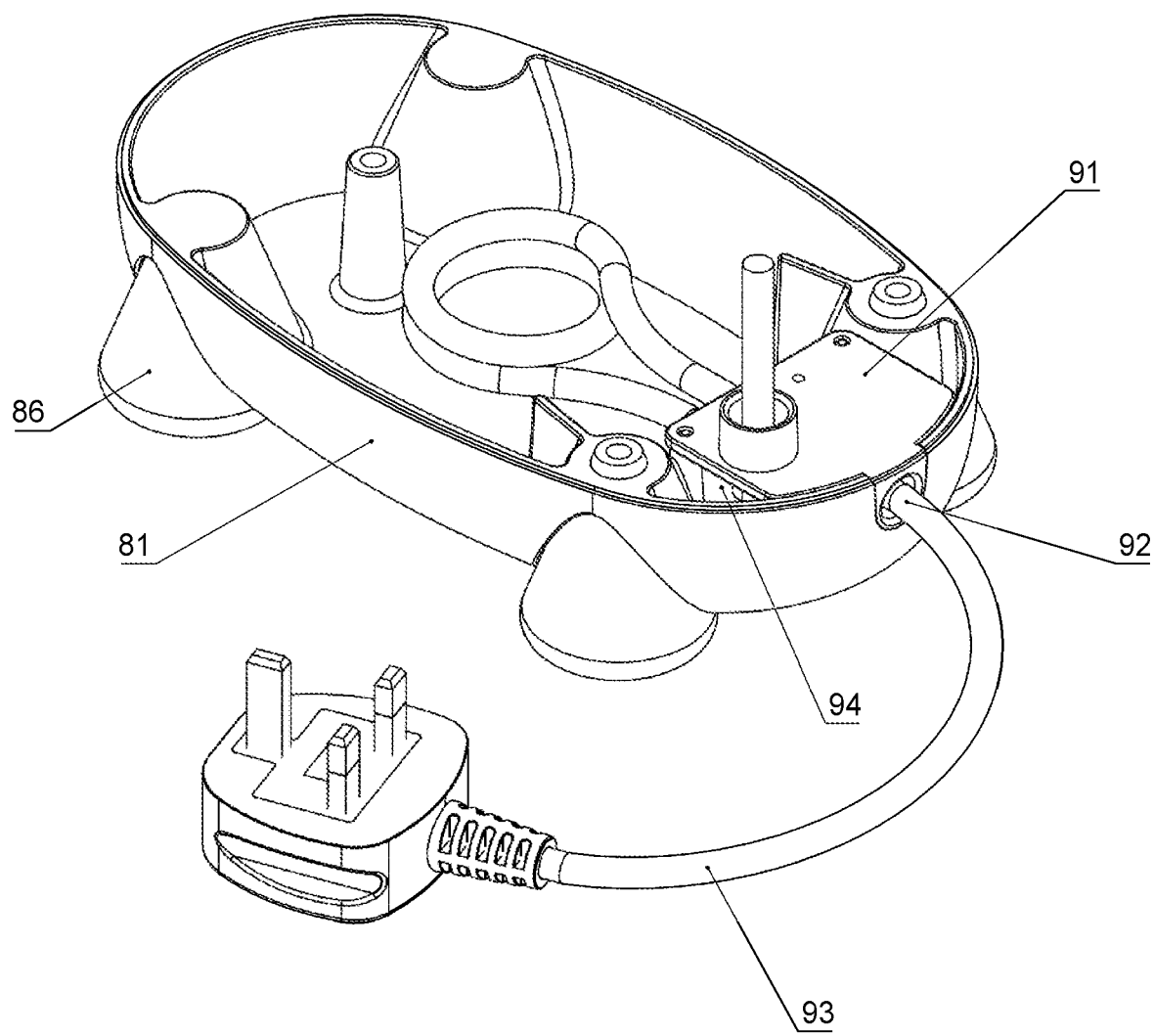
FIG. 8 is a perspective view of the base of the bean grinding apparatus shown in FIG. 1.

For the avoidance of doubt, the skilled person will appreciate that in this specification, the terms "up", "down", "front", "rear", "upper", "lower", "width", etc. refer to the orientation of the components as found in the example when installed for normal use as shown in the Figures.

As shown in the drawings, a bean grinding apparatus 1 includes a body 2 within which is housed an inner grinding burr 3 and a complementary outer grinding burr 4. The burrs are commercially available from Italmill Grinding Technology S.r.l, for example. The inner burr 3 is carried on a shaft 5, which is journaled in a bearing 6 which defines a rotational axis A of the inner burr 3. The outer burr 4 is located within a recess 7 defined by a support element 8. The bearing 6 is located centrally within the recess 7 such that the inner burr 3 on the shaft 5 is arranged concentrically with the outer burr 4 in the recess 7.

To ensure the concentricity of the bearing 6 within the recess 7, it is carried by a bearing support plate 9, which is arranged to form a friction fit within the recess 7. An outer race 10 of the bearing 6 forms a push fit within a seat 11 defined in the underside of the bearing support plate 9 and the outer race 10 is located accurately and securely between the seat 11 and a base surface 12 of the recess 7. The accurate relative positioning of the grinding burrs 3, 4 is important to achieve a consistent and reproducible grind of the beans. The apparatus of the present invention achieves this through the concentricity of the grinding burrs 3,4 and the control of the axial spacing between them. This results in a cost-effective arrangement as the number of components is minimised. This also results in reduced assembly time and costs.

Screws 14 locate the bearing support plate 9 against the base surface 12 by passing through the base surface 12 and threadedly engaging an intermediate member 15, which is itself secured to a lower body portion 17 of the grinding apparatus 1 via screws 16. The outer burr support element 8 is located within an upper body portion 18 of the apparatus 1. As the upper body portion 18 is secured to the intermediate member 15 via the screws 14 and the intermediate member 15 is also secured to the lower body portion 17 via the screws 16, the upper body portion 18 is secured to the lower body portion 17 via the intermediate member 15 and the screws 14, 16. In order to ensure alignment of the upper and lower body portions 18, 17, the intermediate member 15 includes a flanged rim 19 which engages corresponding portions of the lower and upper body portions 17, 18.

A drive mechanism 21 is provided for the inner burr 3 via the shaft 5, which forms the output shaft of a two stage epicyclic gearbox 22, which in turn is driven by a motor 23 located beneath the gearbox 22. These components are well known and will not be described in detail herein. The motor has a housing 24 having two lugs 25 extending down from it. The lugs 25 engage in sockets 27 arranged in a lower end 28 of the lower body portion 17 via bushes 26. The lugs 25 counteract the torque generated between the burrs 3, 4 during grinding. The thrust force that is generated during the grinding process is counteracted as described below.

A grounds directing element 31 is provided between the inner burr 3 and the bearing support plate 9. The grounds directing element 31 comprises three rearwardly swept (i.e. rearwards with respect to a direction of rotation) outwardly projecting fingers 32. The fingers 32 urge the grounds radially away from the inner burr 3. The fingers project from a hub 33, which is recessed to accommodate a boss 34 of the bearing support plate 9. The hub 33 includes a central sleeve 35 which extends along the shaft 5 and abuts an inner race 36 of the bearing 6. A downwards thrust resulting from the grinding action is counteracted by base surface 12 of the recess 7 via the sleeve 35, the inner race 36 and the outer race 10 which together exert an equal force in an upwards direction. A screw 37 connects and retains the inner burr 3 to the shaft 5 and also compresses the sleeve 35 and the inner race 36 of the bearing 6 against a circlip 38 carried by the shaft 5 below the inner race 36.

Whilst the outer burr 4 is adjustable in an axial direction relative to the inner burr 3 (described below), it is fixed against rotation. To fix the outer burr 4 against rotation, it includes an upper attachment 41 secured to it via screws 42. The attachment 41 has a pair of tabs 43 extending radially therefrom which are received in slots 44 defined in the side of the support element 8. The slots 44 include blind bores 45 that accommodate springs 46. The tabs 43 and the slots 44 cooperate to prevent the outer burr 4 from rotating relative to the support element 8 and the tabs 43 and the springs 46 urge the outer burr 4 upwards, away from the inner burr 3.

A grind adjustment funnel ring 47 engages the upper attachment 41 of the outer burr 4. The grind adjustment funnel ring 47 includes a threaded collar 48 which is threadedly received within a threaded bore 49 of the upper body portion 18. Rotating the funnel ring 47 in a clockwise direction urges the outer burr 4 downwards towards the inner burr 3 and rotating the funnel ring in an anti-clockwise direction allows the springs 46 to urge the outer burr 4 upwards away from the inner burr 3. In this way, the fineness of grounds 85 produced by the grinding process can be varied. The funnel ring 47 carries a setting ring 51. The two rings 47, 51 have cooperating lips 52, 53 which hold the setting ring 51 on the funnel ring 47. On its interior, the setting ring 51 defines a series of indents 54. The funnel ring 47 defines a bore 55 which is complementary to the indents 54, in which is located a spring 56 and a detent ball 57. The arrangement allows the setting ring 51 to be both adjusted relative to the funnel ring 47 during calibration (when the burrs are touching) and to maintain its relative orientation to the funnel ring 47 during the adjustment of the fineness of the grounds to be produced, i.e. adjusting the axial spacing between the burrs 3, 4. On a circumferential surface towards the top of the upper body portion 18 indicia 58 are provided. In use, the funnel ring 47 is rotated fully clockwise until outer grinding burr 4 contacts inner grinding burr 3. The setting ring 51 is then zeroed by aligning a mark 59 on the outside of the setting ring 51 with a zero of the indicia 58. The funnel ring 47 is then rotated anti-clockwise by the desired amount according to the indicia 58 corresponding to the desired grinding separation of the burrs 3, 4. The threading of the threaded collar 48 and the threaded bore 49 is fine, whereby friction between the funnel ring 47 and the upper body portion 18 maintains the funnel ring 47 in the desired orientation. This in turn allows the funnel ring 47 to resist an upward thrust on the outer burr 4 generated during the grinding process.

The funnel ring 47 defines a tapered channel 60 for funnelling beans 61 to the burrs 3, 4. The tapered channel 60 defines a reservoir for the beans 61 prior to grinding.

The grounds 85 from the burrs 3, 4 drop into the path of the swept back fingers 32 of the grounds directing element 31. The fingers 32 urge the grounds 85 into a pair of openings 62 in a wall 63 which in part defines the recess 7 at the lowest point of the bearing support plate 9. The support plate 9 defines a 15 degrees slope relative to a horizontal plane and the rotational axis A defines a 15 degrees angle with a vertical plane, such that the support plate 9 is perpendicular to the rotational axis A.

A spout 64 is provided for receiving the grounds 85. The spout 64 has a longitudinal axis which is angled from a vertical plane by 10 degrees in a direction opposite to that of the rotational axis A such that the longitudinal axis of the spout 64 is angled from the rotational axis A by 25 degrees.

The spout 64 defines a grounds flow path P from the grinding apparatus. It will be noted that the rotational axis A and path P form an invented V shape. The intersection of the rotational axis A and the path P (i.e. the point of the V) is located within an upper part of the body 2. Whilst the longitudinal axis of the spout 64 is slightly closer to a vertical plane than the rotational axis A, a bisector of the V is effectively vertical.

The spout 64 is generally circular in cross section. At its upper end 65, it is shaped to abut an outer contour of the support element 8, with a top pin 67 of the spout 64 engaging in a recess 68 formed in the outer contour. A lug 69 engages the underside of the base surface 12 as a cut-out 70 in the intermediate member 15. A screw 71 bearing on the bearing support plate 9 passes through the base surface 12 and engages in the lug to positively locate the spout 64. It also passes through an aperture 72 in the lower body portion 17.

The lower body portion 17 has a base 81 fitted beneath it, which projects forwards to underlie the spout 64. The base 81 and the body 2 define an inverted 7 shape.

The base 81 has a two-part stand 82 for a grounds collection cup 83. With the cup 83 on the stand 82 beneath a distal end 84 of the spout 64, it is able to collect the grounds 85.

In order to avoid the problem of static charge accumulation by the grounds 85, the stand 82 is made from wood and the base 81 is provided with feet 86 also made of wood. It has been found that the electrostatic effect which causes the grounds 85 to adhere to the apparatus 1 or to become fly-away is diminished or removed altogether by forming the stand 82 and the feet 86 of wood.

Experiments utilising the embodiment of the invention described herein demonstrated that 10 g of grounds 85 could be obtained from 10 g of beans 61.

The two part stand 82 comprises a cover 87 which overlies most of the hollow base 81 and which is retained in place by a screw 88 having a head 89 left proud, whereby the screw head 89 engages a circular saucer 90 having a blind central bore defined in its base.

The rear of the hollow base 81 defines inside a cable control molding 91 with an aperture 92 opening outwards for a power cable 93 and a clamp 94 for the cable as it passes up into the lower body portion 17. This arrangement allows the cable 93 to be inserted into the base 81 for storage and withdrawn from the base 81 for use.

The cable 93 extends to a printed circuit board 95 located within the lower body portion 17. The printed circuit board 95 includes a switch 96 for permitting the supply of electrical energy to the motor 23. The printed circuit board 95 further includes an interlock micro-switch 97. The upper body portion 18 includes a lid 98 that is pivotally mounted to the upper body portion 18 via a hinge 102 such that the lid 98 is capable of covering the funnel ring 47 in a closed configuration. The lid 98 carries a magnet 99 and the upper body carries a steel insert 100 which is aligned with the magnet 99 in the closed configuration. The magnetic attraction between the magnet 99 and the steel insert 100 in the closed configuration latches the lid 98 it the closed configuration.

The lid 98 further includes a projection element 103. In the closed configuration, the projection element 103 engages a plunger 101, which in turn is connected to the micro-switch 97 such that in the closed configuration, the micro-switch permits operation of the grinder when the operating switch is activated. When the lid 98 is opened (i.e. hinged out of its closed configuration), the projection element 103 is disengaged from the plunger 101, which in turn opens the micro-switch 97. The opening of the micro-switch 97 interrupts power to the motor 23 and the grinding apparatus 1 becomes inoperable. This arrangement prevents the grinding apparatus 1 being operated with the lid 98 in an open configuration.

The lid 98 is formed from a transparent polymeric material so that the quantity of beans 61 in the tapered channel 60 is visible to the user.

The invention claimed is:

1. A bean grinding apparatus comprising:
   a reservoir in communication with a set of grinding burrs, the set of grinding burrs being driven to rotate by an electric motor, the reservoir being defined by a reservoir body;
   a manual controller configured to control the set of grinding burrs, the manual controller including an outer burr adjustment mechanism configured to adjust an axial location of an outer burr relative to an inner burr, the outer burr adjustment mechanism including a biasing member configured to bias the outer burr away from the inner burr; and
   a cover hingedly coupled to the reservoir body and having a closed configuration in which the reservoir is covered by the cover and access to the reservoir is prevented, and an open configuration in which access to the reservoir is permitted, the cover further covering the manual controller when in the closed configuration;
   wherein the electric motor includes an immobilising switch having an operating position which permits the operation of the motor, and an immobilised position in which operation of the motor is prevented;
   wherein the cover includes a switch engagement element; and
   wherein the switch engagement element positions the immobilising switch in the operating position when the cover is in its closed configuration.

2. The bean grinding apparatus according to claim 1, wherein the immobilising switch is biased to its immobilised position.

3. The bean grinding apparatus according to claim 1, wherein the immobilising switch interrupts power to the electric motor when in its immobilised position.

4. The bean grinding apparatus according to claim 1, wherein the switch engagement element comprises a projecting rod and the immobilising switch defines an apertures which is sized and configured to receive therein the projecting rod.

5. The bean grinding apparatus according to claim 1, wherein the reservoir includes an opening and the cover covers the entirety of the reservoir opening when in its closed configuration.

6. The bean grinding apparatus according to claim 1, wherein the cover is transparent.

7. The bean grinding apparatus according to claim 1, wherein the cover and/or the reservoir body includes a latch configured to releasably retain the cover in its closed configuration.

8. The bean grinding apparatus according to claim 1, wherein the grinding burrs are variable to vary an output of ground coffee beans.

* * * * *